United States Patent

Colucci

[15] 3,681,812
[45] Aug. 8, 1972

[54] WINDSCREEN WIPER FOR MOTOR VEHICLES

[72] Inventor: Ivo Colucci, Milan, Italy
[73] Assignee: Alfa Romeo S.p.A., Milan, Italy
[22] Filed: March 12, 1970
[21] Appl. No.: 19,001

[52] U.S. Cl. ............................... 15/250.3, 15/250.19
[51] Int. Cl. .................................................. B60s 1/24
[58] Field of Search...15/250, 250.16, 250.17, 250.3, 15/250.31, 250.19, 250.15

[56] References Cited

UNITED STATES PATENTS

| | | | |
|---|---|---|---|
| 2,046,108 | 2/1936 | Drew | 15/250.3 |
| 2,355,860 | 8/1944 | Hansen | 15/250.3 |
| 1,611,073 | 12/1926 | Reynhout | 15/250.3 X |
| 2,895,157 | 7/1959 | Kocourek | 15/250.16 X |
| 2,060,684 | 11/1936 | Moorhouse | 15/250.3 X |

FOREIGN PATENTS OR APPLICATIONS

| | | | |
|---|---|---|---|
| 1,071,838 | 6/1969 | Great Britain | 15/250.19 |
| 1,012,371 | 12/1965 | Great Britain | 15/250.3 |

*Primary Examiner*—Walter A. Scheel
*Assistant Examiner*—Alan I. Cantor
*Attorney*—Holman & Stern

[57] ABSTRACT

A windscreen wiper assembly for motor vehicles comprising a wiper rotatably pivoted on a screen, said screen being rotatably pivoted on the body of the motor vehicle; a driving motor for the windscreen wiper which motor is fixed on the vehicle body and connected to said windscreen wiper by way of an articulated crank mechanism.

4 Claims, 6 Drawing Figures

WINDSCREEN WIPER FOR MOTOR VEHICLES

The windscreen wiper in its non-operating position on motor vehicles usually lies along the line where the windscreen and body-work join, a situation which could be considered anti-aesthetic.

A method of obviating this disadvantage is already known in which the windscreen wiper is masked by means of a fixed screen provided on the body.

However, such a solution is not the best for the motor vehicle from the aerodynamic point of view, because said fixed screen, especially at high speeds, offers a certain resistance to the air and creates undesirable vortices in the space between it and the windscreen glass.

To obviate this disadvantage the use of a screen has already been proposed which is movable between a raised position which allows operation of the windscreen wiper and a lowered position which masks the view without offering resistance to air and without creating undesirable vortices.

This latter solution however only partly obviates said disadvantage, i.e. only when the windscreen wiper is not in use, because when this latter has to be driven it is necessary to raise the screen, which then offers a certain resistance to the air and causes formation of vortices.

Further this mobile screen gives rise to the disadvantage of requiring a control device inside the motor vehicle for raising and lowering it, independent of the control device for the windscreen wiper, a fact which is not economically convenient.

The object of this invention is to provide a windscreen wiper provided with a screen for masking it in its non-operating position and which permits its operation while offering as low a resistance as possible to the air in such a manner as to avoid as far as possible the formation of air vortices.

This object is attained by providing a windscreen wiper which is rotatably pivoted to the body of the motor vehicle, said windscreen wiper being driven by a motor preferably fixed to the body, by means of an articulated crank mechanism.

The characteristics of the present invention will be evident from the following description given by way of example with reference to the accompanying drawings in which.

Figure 1:
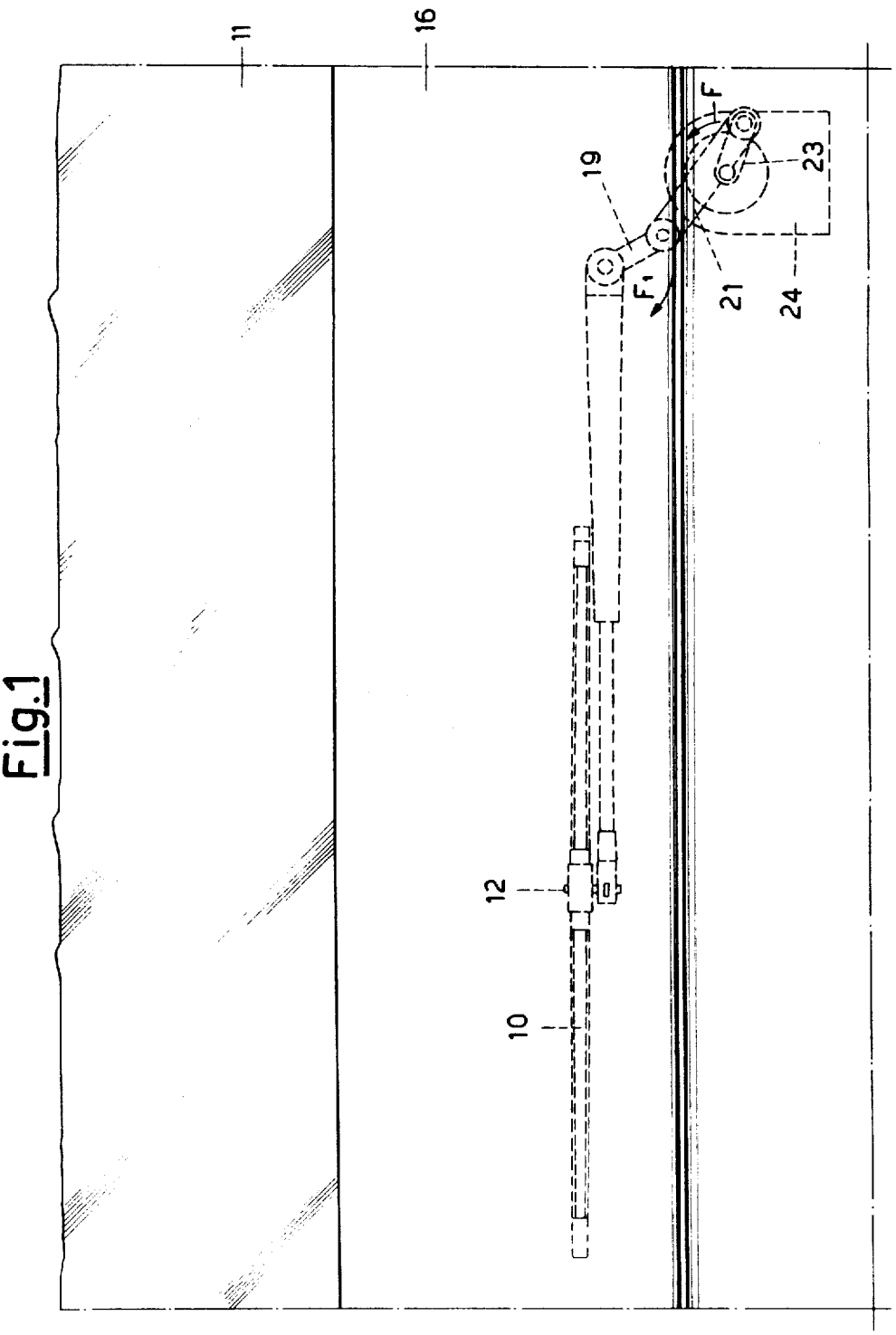
FIG. 1 is a front elevational view of a windscreen wiper according to the present invention in the non-operating position.
Figure 2:
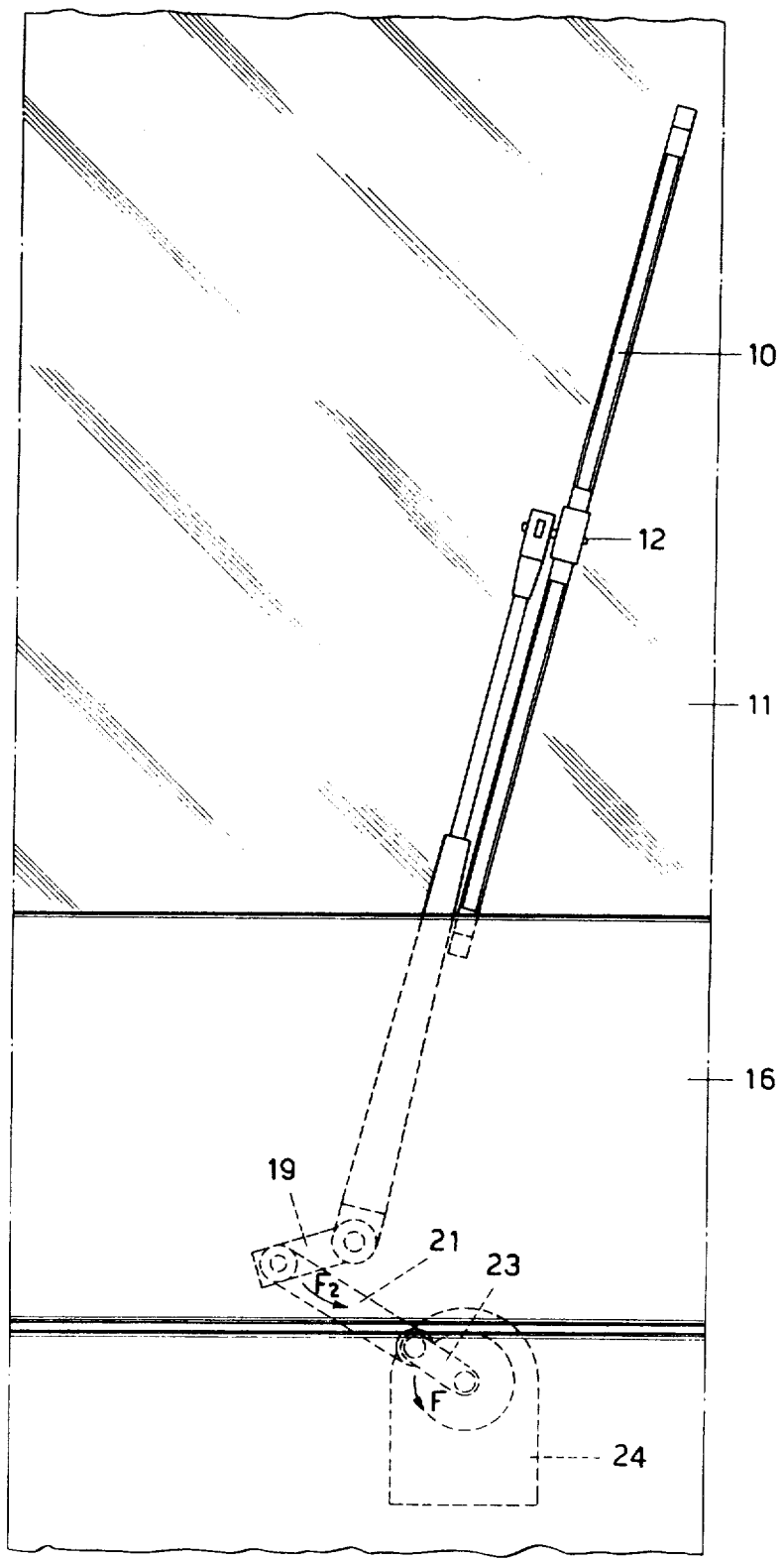
FIG. 2 is a frontal elevational view of the windscreen wiper of FIG. 1 in an operational position.

With reference to the drawings, the windscreen wiper according to the invention comprises a wiper blade 10 which acts against the glass 11 of the motor vehicle windscreen, said wiper blade being pivoted at 12 to one end of a rod or arm 13 which is rotatably pivoted substantially at its opposite end to a pivot 14 rigid with a support bracket 15 fixed on a plate screen 16.

Said screen 16 is rotatably pivoted at 17 to the body 18 of the motor vehicle and is movable between two positions (FIGS. 3 and 4) which correspond respectively to the non-operating and operating position of the windscreen wiper, as will be described in detail hereinafter.

A spring 26 holds the screen 16 adjacent to the glass 11 of the windscreen when the windscreen wiper is not in operation.

Figure 3:
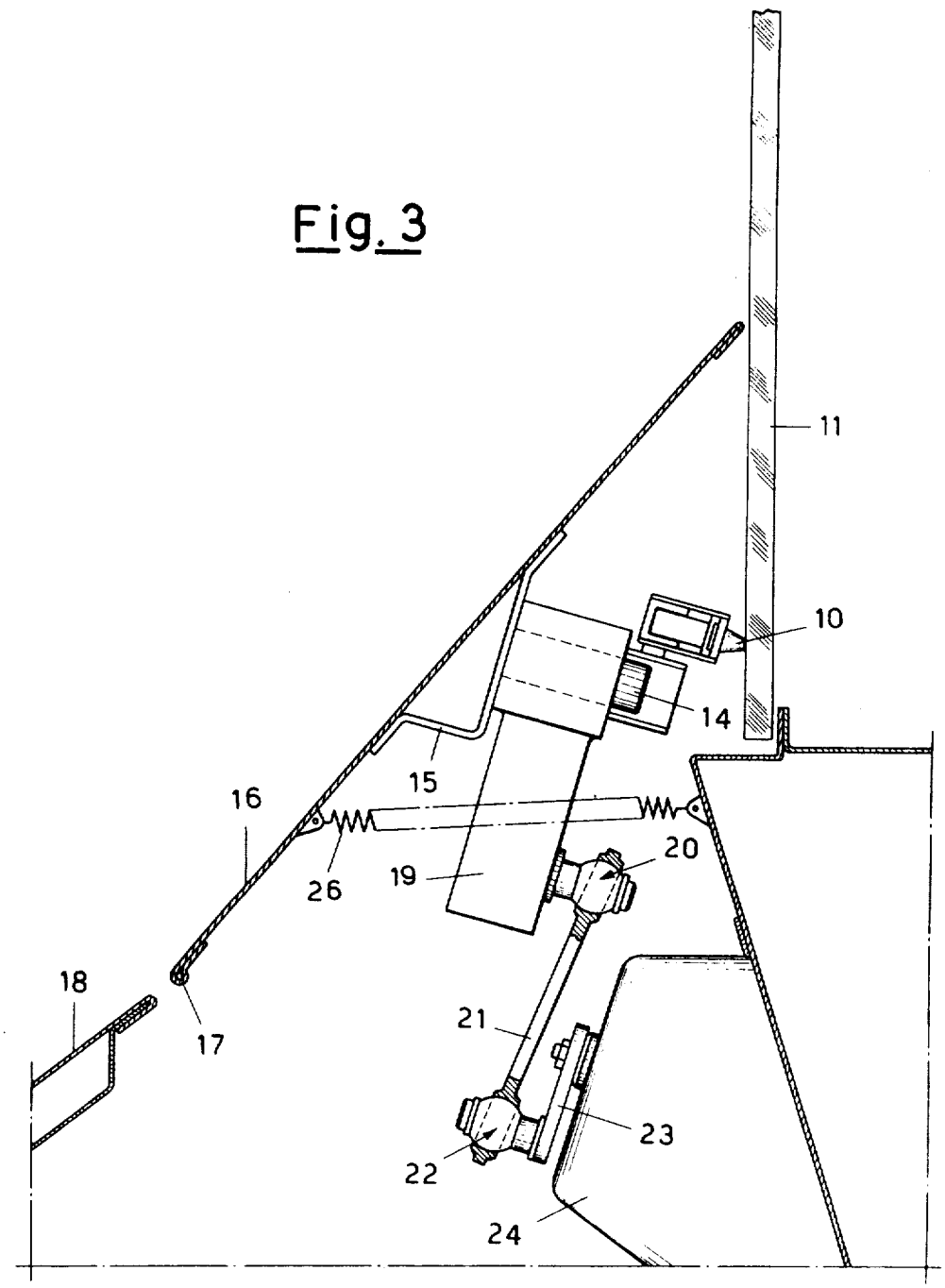
FIG. 3 is a lateral partially sectional elevational view on an enlarged scale with respect to that of FIGS. 1 and 2, of the windscreen wiper in the non-operating position.
Figure 4:
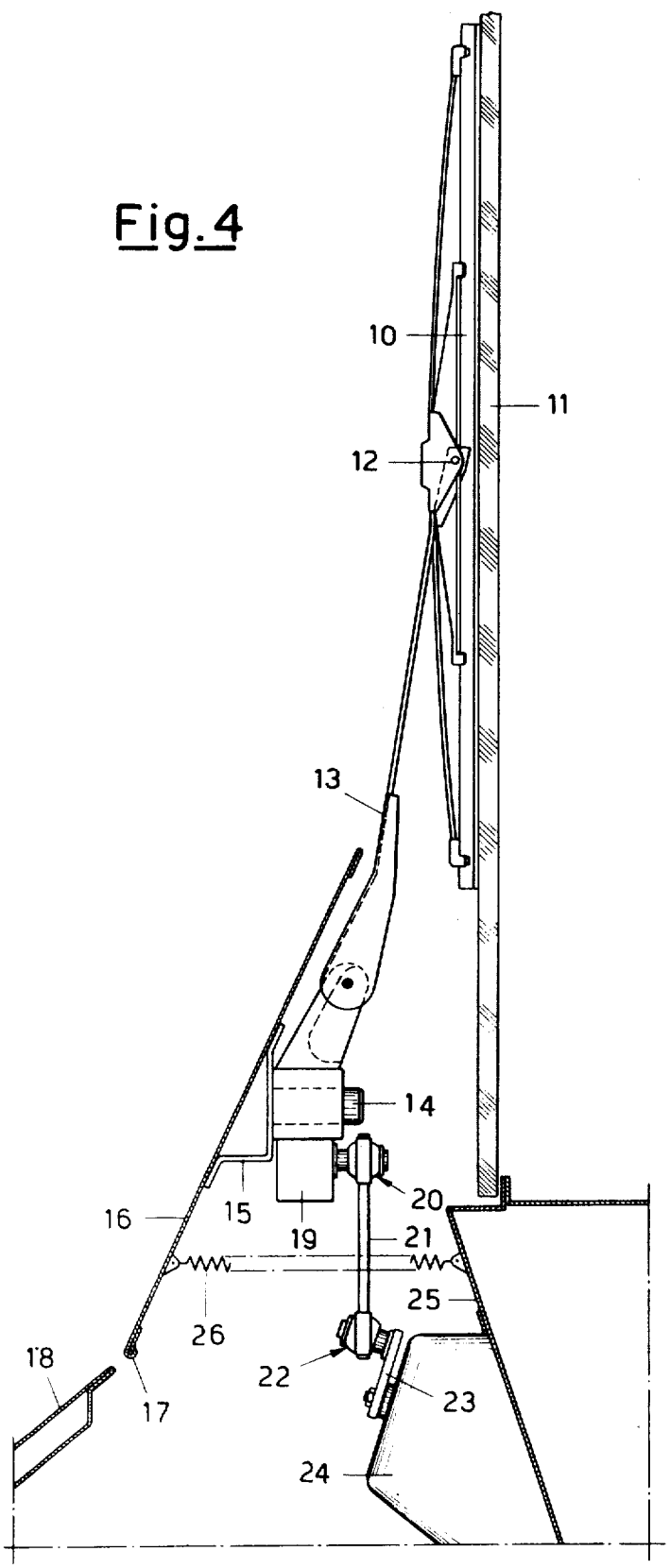
FIG. 4 is a lateral elevational view of the windscreen wiper in an operational position.
Figure 5:
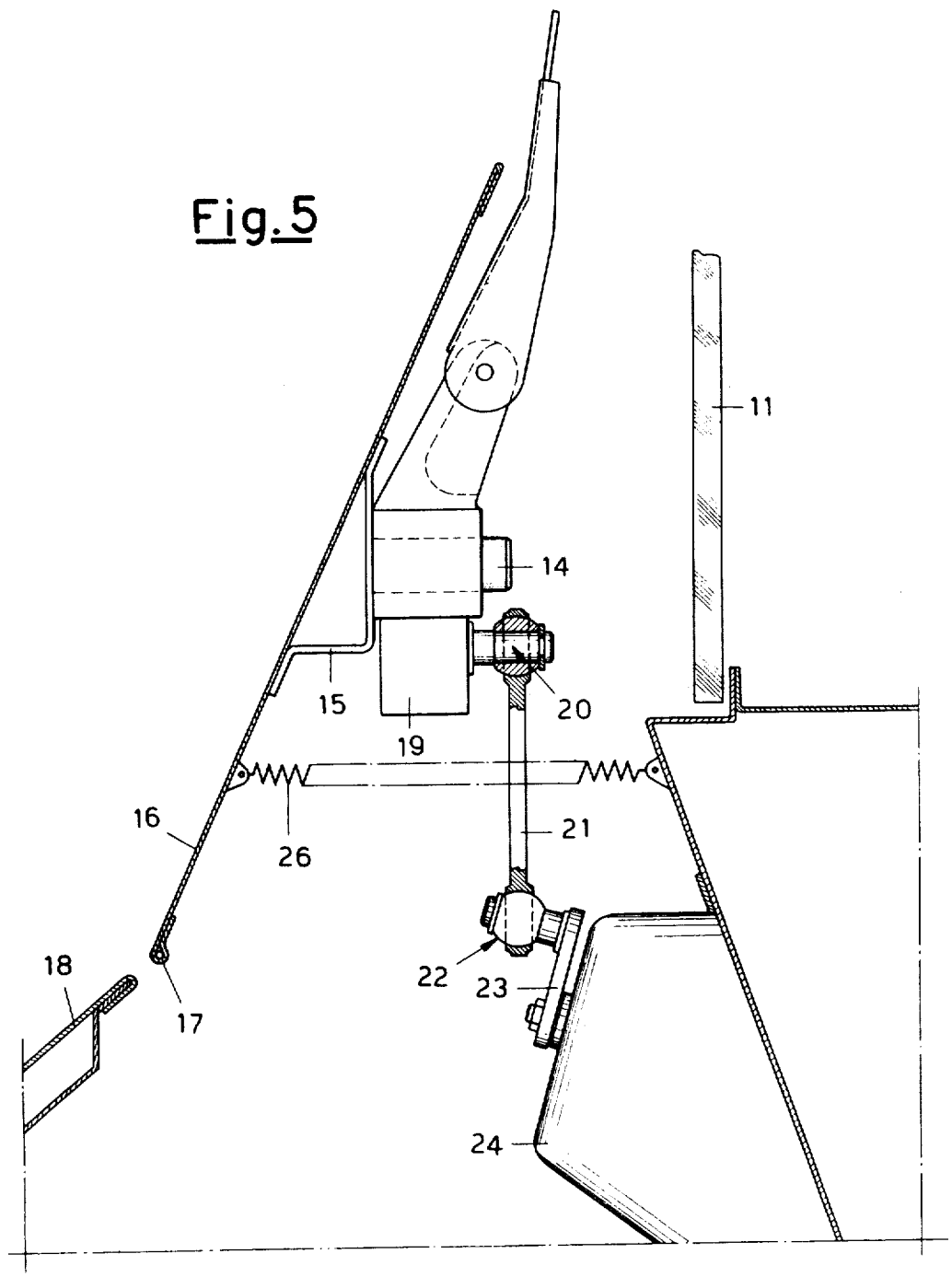
FIG. 5 is a partially sectional detailed lateral elevation on the same scale as FIG. 3, of the windscreen wiper in the same operating position as shown in FIG. 4.

As can be seen in FIGS. 3 and 5, the extremity of the rod 13 pivoted on the pivot 14 comprises an elongation 19 provided with a ball joint 20 to which is connected a connecting rod 21 connected to the opposite extremity by means of a ball joint 22, similar to 20, at one extremity of a crank 23 made to rotate by a motor 24 fixed on a part 25 of the motor vehicle body.

The operation of the windscreen wiper herewith described is as follows.

Referring particularly to FIGS. 1, 2, 3 and 5, it is seen that the crank 23 when made to turn in the direction of the arrow F by the motor 24 moves the connecting rod 21 with reciprocating motion. Said connecting rod, starting with the windscreen wiper in the non-operating position, thrusts the elongation 19 of the rod 13 in the direction of the arrow F1 during the first half turn of the crank 23, so making the wiper blade 10 of the windscreen wiper slide on the glass 11 of the windscreen from the position shown in FIG. 1 to the position shown in FIG. 2, while during the remaining half turn of the crank 23, the connecting rod 21 pulls said elongation 19 in the direction of the arrow F2, so returning the wiper blade 10 to the position shown in FIG. 1, and so on. The sliding of the wiper blade 10 on the glass 11 from the position shown in FIG. 1 to the position shown in FIG. 2 simultaneously causes a reaction sufficient to overcome the action of the spring 26, in the sense of withdrawing the screen 16 from the glass 11, so bringing it from the position shown in FIG. 3 to the position shown in FIG. 5 so as to allow the wiper blade 10 and the greater part of the rod 13 to pass between the glass 11 and the upper edge of the screen 16. When the windscreen wiper returns to the position shown in FIG. 3, the spring 26 returns the screen 16 adjacent to the glass 11 of the windscreen.

From the details shown in FIGS. 3 and 5, it is clear that such a movement of the screen 16 is permitted by the use of the articulated joints 20 and 22 on the control crank mechanism of the windscreen wiper.

In such a manner, when the windscreen wiper is not in operation it is hidden from view by the screen 16, while when it is in operation the screen 16 by moving itself quickly with it, offers a minimum resistance to the air. Further, such a device does not require supplementary operating controls inside the motor vehicle.

The articulated joints of the said crank mechanism could also be of a type different from ball joints.

Figure 6:
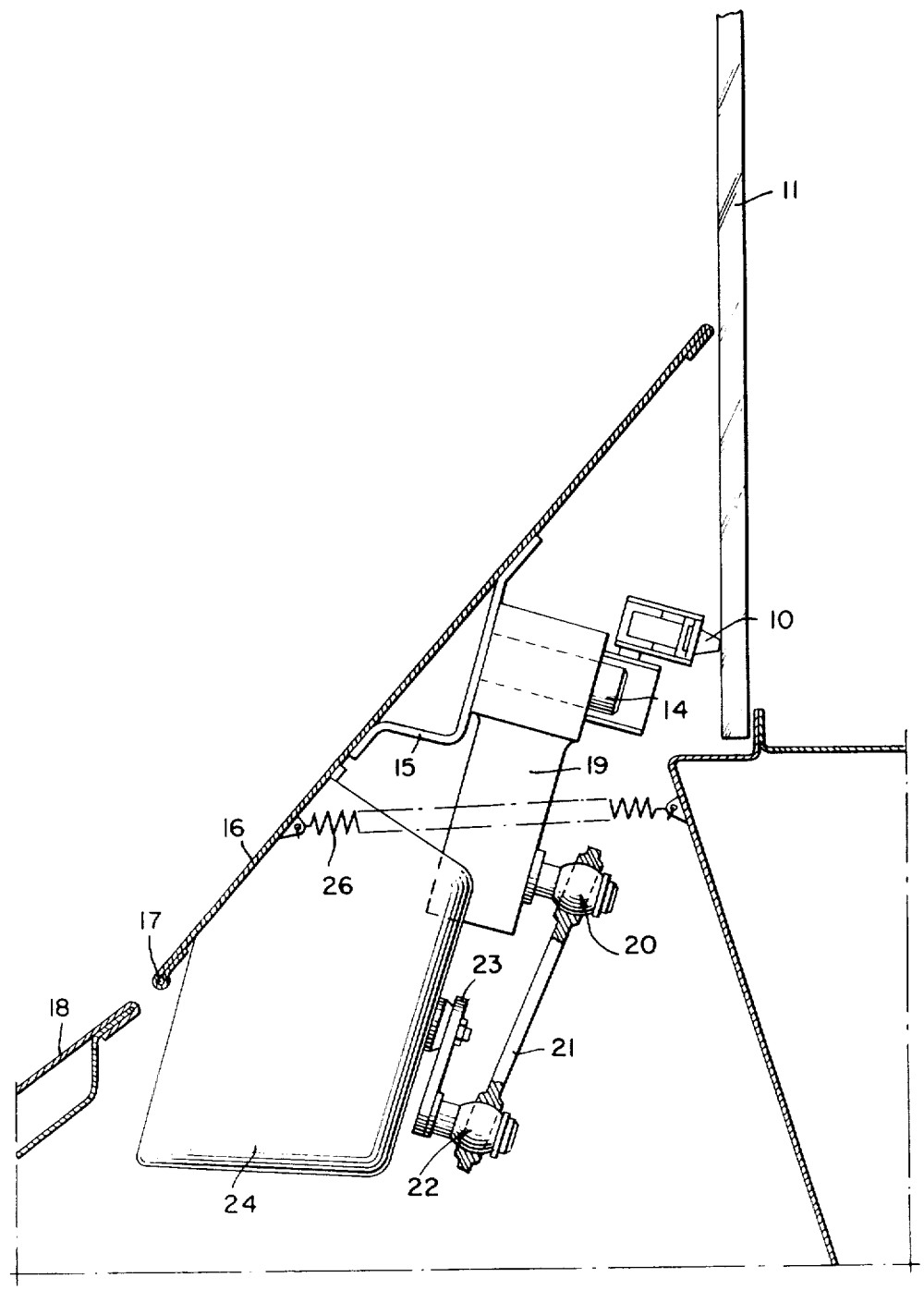
FIG. 6 is a lateral partially sectional elevational view of a modification similar to that of FIG. 3, but with the driving motor mounted on the plate-screen instead of on the vehicle body.

Further the driving motor for the windscreen wiper could also be connected directly to the screen of the windscreen wiper instead of to the motor vehicle body as illustrated in FIG. 6.

For simplicity of drawing, a windscreen wiper with only one wiper blade has been illustrated, but it could also have two without the inventive concept changing.

What is claimed is:

1. A windscreen wiper assembly for vehicles, located external to the vehicle dash board and comprising: a wiping blade; a wiping arm at one end of which the wiping blade is secured; means pivoting said wiping arm near its other end to a support bracket; said support bracket being secured to a plate screen; said plate-screen inclined to the vehicle windscreen and having a lower edge hinged to the vehicle body, the upper edge of said plate screen located adjacent to the windscreen and above said lower edge, the screen being so arranged as to conceal said pivoting means and at least a portion of the wiping arm; a spring means biassing the plate-screen towards the vehicle windscreen; an articulated connection at said other end of the wiping arm connected to an assembly of a connecting rod and a crank rod driven by a motor, whereby a movement of the upper edge of the plate-screen away from the vehicle windscreen to make way for the wiper to emerge and operate is automatically actuated against the bias of said spring means by a start of a wiping oscillatory motion of the wiping arm.

2. A windscreen wiper assembly as claimed in claim 1, wherein said articulated connection comprises a first ball joint at one end of said connecting rod, and a second ball joint at the other end of said connecting rod and provided for connection between the connecting rod and said crank rod.

3. A windscreen wiper assembly as claimed in claim 2, wherein said motor is part of the assembly and is adapted to be mounted on the vehicle body.

4. A windscreen wiper assembly as claimed in claim 1 wherein said motor is part of the assembly and is adapted to be concealingly secured to the plate-screen.

* * * * *